(12) United States Patent
Rothstein et al.

(10) Patent No.: US 8,010,668 B1
(45) Date of Patent: Aug. 30, 2011

(54) SELECTIVE COMPRESSION FOR NETWORK CONNECTIONS

(75) Inventors: Jesse A. Rothstein, Seattle, WA (US); Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 12/981,338

(22) Filed: Dec. 29, 2010

Related U.S. Application Data (62) Division of application No. 10/957,024, filed on Oct. 1, 2004.

(51) Int. Cl.
*G06F 15/173* (2006.01)
*G06F 15/16* (2006.01)

(52) U.S. Cl. .......... 709/224; 709/249

(58) Field of Classification Search ........ 709/224, 709/249
See application file for complete search history.

(56) References Cited

U.S. PATENT DOCUMENTS

| | | |
|---|---|---|
| 4,021,782 A | 5/1977 | Hoerning |
| 4,054,951 A | 10/1977 | Jackson et al. |
| 4,316,222 A | 2/1982 | Subramaniam et al. |
| 4,386,416 A | 5/1983 | Giltner et al. |
| 4,593,324 A | 6/1986 | Ohkubo et al. |
| 4,626,829 A | 12/1986 | Hauck |
| 4,701,745 A | 10/1987 | Waterworth et al. |
| 4,862,167 A | 8/1989 | Copeland, III |
| 4,876,541 A | 10/1989 | Storer |
| 4,890,282 A | 12/1989 | Lambert et al. |
| 4,897,717 A | 1/1990 | Hamilton et al. |
| 4,906,991 A | 3/1990 | Fiala et al. |
| 4,971,407 A | 11/1990 | Hoffman |
| 4,988,998 A | 1/1991 | O'Brien |
| 5,003,307 A | 3/1991 | Whiting et al. |
| 5,016,009 A | 5/1991 | Whiting et al. |
| 5,109,433 A | 4/1992 | Notenboom |
| 5,126,739 A | 6/1992 | Whiting et al. |
| 5,146,221 A | 9/1992 | Whiting et al. |
| 5,150,430 A | 9/1992 | Chu |
| 5,155,484 A | 10/1992 | Chambers, IV |
| 5,167,034 A | 11/1992 | MacLean, Jr. et al. |
| 5,212,742 A | 5/1993 | Normile et al. |
| 5,249,053 A | 9/1993 | Jain |
| 5,280,600 A | 1/1994 | Van Maren et al. |
| 5,293,388 A | 3/1994 | Monroe et al. |
| 5,319,638 A | 6/1994 | Lin |
| 5,341,440 A | 8/1994 | Earl et al. |

(Continued)

OTHER PUBLICATIONS

W3C, "HTTP/1.1 and Nagle's Algorithm," visited Dec. 6, 2005, 3 pages, <http://www.w3.org/Protocols/HTTP/Performance/Nagle/>.

(Continued)

*Primary Examiner* — Jerry Dennison
(74) *Attorney, Agent, or Firm* — Frommer Lawrence & Haug LLP; Jamie L. Wiegand (57) ABSTRACT

A system, apparatus, and method selectively provides content compression to a client based, in part, on whether the network connection from the client is determined to be a high latency, low-bandwidth connection. The present invention gathers one or more network metrics associated with the connection from the client. In one embodiment, the metrics include estimated TCP metrics, including smoothed round trip time, maximum segment size (MSS), and bandwidth delay product (BWDP). These estimated network metrics are employed to make an application layer decision of whether the client connection is a high latency, low-bandwidth connection. If it is, then content may be selectively compressed virtually on the fly for transfer over the network connection. In one embodiment, the selective compression uses a content encoding compression feature of the HTTP protocol standard.

20 Claims, 5 Drawing Sheets

U.S. PATENT DOCUMENTS

| | | | |
|---|---|---|---|
| 5,367,629 | A | 11/1994 | Chu et al. |
| 5,379,036 | A | 1/1995 | Storer |
| 5,410,671 | A | 4/1995 | Elgamal et al. |
| 5,414,425 | A | 5/1995 | Whiting et al. |
| 5,463,390 | A | 10/1995 | Whiting et al. |
| 5,479,587 | A | 12/1995 | Campbell et al. |
| 5,488,364 | A | 1/1996 | Cole |
| 5,504,842 | A | 4/1996 | Gentile |
| 5,506,944 | A | 4/1996 | Gentile |
| 5,539,865 | A | 7/1996 | Gentile |
| 5,542,031 | A | 7/1996 | Douglass et al. |
| 5,544,290 | A | 8/1996 | Gentile |
| 5,546,395 | A | 8/1996 | Sharma et al. |
| 5,546,475 | A | 8/1996 | Bolle et al. |
| 5,553,160 | A | 9/1996 | Dawson |
| 5,615,287 | A | 3/1997 | Fu et al. |
| 5,638,498 | A | 6/1997 | Tyler et al. |
| 5,768,445 | A | 6/1998 | Troeller et al. |
| 5,768,525 | A | 6/1998 | Kralowetz et al. |
| 5,774,715 | A | 6/1998 | Madany et al. |
| 5,805,932 | A | 9/1998 | Kawashima et al. |
| 5,825,890 | A | 10/1998 | Elgamal et al. |
| 5,850,565 | A | 12/1998 | Wightman et al. |
| 5,874,907 | A | 2/1999 | Craft |
| 5,884,269 | A | 3/1999 | Cellier et al. |
| 5,892,847 | A | 4/1999 | Johnson |
| 5,951,623 | A | 9/1999 | Reynar et al. |
| 5,991,515 | A | 11/1999 | Fall et al. |
| 6,006,264 | A | 12/1999 | Colby et al. |
| 6,052,785 | A | 4/2000 | Lin et al. |
| 6,061,454 | A | 5/2000 | Malik et al. |
| 6,070,179 | A | 5/2000 | Craft |
| 6,098,108 | A | 8/2000 | Sridhar et al. |
| 6,185,625 | B1 | 2/2001 | Tso et al. |
| 6,223,287 | B1 | 4/2001 | Douglas et al. |
| 6,243,761 | B1 | 6/2001 | Mogul et al. |
| 6,314,465 | B1 | 11/2001 | Paul et al. |
| 6,367,009 | B1 | 4/2002 | Davis et al. |
| 6,442,140 | B1 | 8/2002 | Kirschenbaum |
| 6,532,481 | B1 | 3/2003 | Fassett, Jr. |
| 6,584,567 | B1 | 6/2003 | Bellwood et al. |
| 6,598,071 | B1 | 7/2003 | Hayashi et al. |
| 6,643,701 | B1 | 11/2003 | Aziz et al. |
| 6,662,233 | B1 | 12/2003 | Skarpness et al. |
| 6,674,717 | B1 | 1/2004 | Duong-van et al. |
| 6,681,327 | B1 | 1/2004 | Jardin |
| 6,718,388 | B1 | 4/2004 | Yarborough |
| 6,725,253 | B1 | 4/2004 | Okano et al. |
| 6,728,785 | B1 | 4/2004 | Jungck |
| 6,757,255 | B1 | 6/2004 | Aoki et al. |
| 6,772,225 | B1 | 8/2004 | Jennings et al. |
| 6,810,411 | B1 | 10/2004 | Coughlin et al. |
| 6,842,768 | B1 | 1/2005 | Shaffer et al. |
| 6,973,622 | B1 | 12/2005 | Rappaport et al. |
| 7,012,893 | B2 | 3/2006 | Bahadiroglu |
| 7,051,126 | B1 | 5/2006 | Franklin |
| 7,102,996 | B1 | 9/2006 | Amdahl et al. |
| 7,126,955 | B2 | 10/2006 | Nabhan et al. |
| 7,142,512 | B1 | 11/2006 | Kobayashi et al. |
| 7,287,094 | B2 | 10/2007 | Mogul |
| 7,293,094 | B2 | 11/2007 | Vaman et al. |
| 7,296,089 | B2 | 11/2007 | Krishnamurthy et al. |
| 7,299,300 | B2 | 11/2007 | Desai et al. |
| 7,388,841 | B2 | 6/2008 | Shao et al. |
| 2002/0073238 | A1 | 6/2002 | Doron |
| 2002/0199012 | A1 | 12/2002 | Cable et al. |
| 2003/0004998 | A1 | 1/2003 | Datta |
| 2003/0023578 | A1 | 1/2003 | Durand et al. |
| 2003/0028606 | A1 | 2/2003 | Koopmans et al. |
| 2003/0126255 | A1 | 7/2003 | Rice et al. |
| 2003/0200283 | A1 | 10/2003 | Suryanarayana et al. |
| 2004/0010621 | A1 | 1/2004 | Afergan et al. |
| 2004/0054805 | A1 | 3/2004 | Sen et al. |
| 2004/0236826 | A1 | 11/2004 | Harville et al. |
| 2005/0015765 | A1 | 1/2005 | Covell et al. |
| 2005/0063303 | A1 | 3/2005 | Samuels et al. |
| 2005/0074007 | A1 | 4/2005 | Samuels et al. |
| 2005/0100014 | A1 | 5/2005 | Brown et al. |
| 2005/0108420 | A1 | 5/2005 | Brown et al. |
| 2005/0114445 | A1 | 5/2005 | Tracton et al. |
| 2005/0187979 | A1 | 8/2005 | Christensen et al. |
| 2005/0201383 | A1 | 9/2005 | Bhandari et al. |
| 2005/0265235 | A1 | 12/2005 | Accapadi et al. |
| 2006/0015637 | A1 | 1/2006 | Chung |
| 2006/0265689 | A1 | 11/2006 | Kuznetsov et al. |
| 2007/0104326 | A1 | 5/2007 | Feigenbaum et al. |
| 2007/0261004 | A1 | 11/2007 | Swildens et al. |

OTHER PUBLICATIONS

Tormasov, A. et al., "TCP/IP options for high-performance data transmission," visited Dec. 9, 2005, 4 pages, <http://builder.com.com/5100-6732-1050878.html>.

Non-final Rejection in U.S. Appl. No. 10/957,024 mailed Feb. 6, 2008, 27 pgs.

Final Rejection in U.S. Appl. No. 10/957,024, mailed Jan. 23, 2009, 32 pgs.

Advisory Action in U.S. Appl. No. 10/957,024, mailed Apr. 1, 2009, 3 pgs.

Restriction Requirement in U.S. Appl. No. 10/957,024, mailed Jul. 9, 2009, 5 pgs.

Official Communication for U.S. Appl. No. 10/957,024, mailed Nov. 9, 2009.

Official Communication for U.S. Appl. No. 10/957,024, mailed May 21, 2010.

Official Communication for U.S. Appl. No. 10/957,024 mailed Oct. 28, 2010.

Official Communication for U.S. Appl. No. 11/344,687, mailed Oct. 27, 2008.

Official Communication for U.S. Appl. No. 11/344,687, mailed Apr. 16, 2009.

Official Communication for U.S. Appl. No. 11/344,687, mailed Sep. 17, 2009.

Official Communication for U.S. Appl. No. 11/344,687, mailed Oct. 15, 2009.

Official Communication for U.S. Appl. No. 11/344,687, mailed Jan. 19, 2010.

Official Communication for U.S. Appl. No. 11/344,687, mailed May 18, 2010.

Official Communication for U.S. Appl. No. 11/344,687, mailed Aug. 2, 2010.

Official Communication for U.S. Appl. No. 11/344,687, mailed Sep. 7, 2010.

"HTTP Compression Speeds up the Web", pp. 1-5 can be found at http://www.webreference.com/internet/software/servers/http/compression/, accessed Dec. 30, 2004.

"Use HTTP Compression", pp. 1-4, can be found at http://www.websiteoptimization.com/speed/tweak/compress/, accessed Dec. 30, 2004.

"AppCelera: Smart Compression", pp. 1-5, can be found at http://www.eweek.com/article2/0,1759,755242,00.asp, accessed Dec. 30, 2004.

Srinivasan Seshan et al., "SPAND: Shared Passive Network Performance Discovery", USENIX Symposium on Internet Technologies and Systems, 1997, pp. 1-18.

R. Fielding et al., "Hypertext Transfer Protocol—HTTP/1.1", IETF, RFC 2616, pp. 1-165, 1999.

Cheng, J.M., et al. "A fast, highly reliable data compression chip and algorithm for storage systems," IBM, vol. 40, No. 6, 11 pgs.

Simpson, W, "The Point-To-Point Protocol (PPP)," RFC 1661, Jul. 1994, 54 pgs.

Schneider, K., et al, "PPP for Data Compression in Data Circuit-Terminating Equipment (DCE)," RFC 1976, Aug. 1996, 10 pgs.

Castineyra, I., et al. "The Nimrod Routing Architecture," RFC 1992, Aug. 1996, 27 pgs.

Degermark, Mikael et al., "Low-Loss TCP/IP Header Compression for Wireless Networks," J.C. Baltzar AG, Science Publishers, Oct. 1997, pp. 376-387.

"Direct Access Storage Device Compression and Decompression Data 38, Flow," IBM Technical Disclosure Bulletin, vol. 38, No. 11, Nov. 1995, pp. 291-295.

"Drive Image Professional for DOS, OS/2, and Windows," WSDC Dowload Guide, http://wsdcds01.watson.ibm.com/WSDC.nsf/Guides/Download/Applications-DriveImage.htm, accessed Nov. 22, 1999, 4 pgs.

"Drive Image Professional," WSDC Download Guide, http://wsdcds01.watson.ibm.com/wsdc.nsf/Guides/Download/Applications-DriveImage.htm, accessed May 3, 2001, 5 pgs.

Electronic Engineering Times, Issue 759, Aug. 16, 1993, 37 pgs.

Adaptive Lossless Data Compression—ALDC, IBM, Jun. 15, 1994, 2 pgs.

ALDC1-5S—Adaptive Lossless Data Compression, IBM Microelectronics, May 1994. 2 pgs.

ALDC1-20S—Adaptive Lossless Data Compression, IBM Microelectronics, May 1994, 2 pgs.

ALDC1-40S—Adaptive Lossless Data Compression, IBM Microelectronics, May 1994, 2 pgs.

ALDC-MACRO—Adaptive Lossless Data Compression, IBM Microelectronics, May 1994, 2 pgs.

Craft, David J., "Data Compression Choice No Easy Call," Computer Technology Review, Jan. 1994, 2 pgs.

"Data Compression Applications and Innovations Workshop," Proceedings of a Workshop held in conjunction with the IEEE Data Compression Conference, Mar. 31, 1995, 123 pgs.

IBM Microelectronics Comdex Fall 1993 Booth Location, 1 pg.

"IBM Technology Products Introduces New Family of High-Performance Data Compression Products," IBM Coporation, Somers, NY, Aug. 16, 1993, 6 pgs.

Zebrose, Katherine L., "Integrating Hardware Accelerators into Internetworking Switches," Telco Systems, 10 pgs., date unknown.

Readme, Powerquest Corporation, 6 pgs., Copyright 1994-1999.

Costlow, Terry "Sony designs faster, denser tape drive," Electronic Electronic Engineering Times, May 20, 1996, 2 pgs.

Electronic Engineering Times, Issue 767, Oct. 11, 1993, 34 pgs.

"IBM Announces New Feature for 3480 Subsystem." Tucson Today, vol. 12, No. 337, Jul. 25, 1989, 1 pg.

Craft, D.J. "A fast hardware data compression algorithm and some algorithmic extensions," IBM Journal of Research and Development, vol. 42, No. 6, Nov. 1998, 14 pgs.

"Magstar and IBM 3590 High Performance Tape Subsystem Technical Guide," IBM, Nov. 1996, 287 pgs.

Paxson, V., RFC 2525, "Known TCP Implementation Problems," Mar. 1999, 61 pages.

Rescorla, E. "SSL and TLS, Designing and Building Secure Systems", 2001, Addison-Wesley, 46 pages.

RSA Laboratories, "PKCS #1 v2.0: RSA Cryoptography Standard." Oct. 1, 1998, 35 pages.

SearchNetworking.com, "Nagle's algorithm," visited Dec. 6, 2005, 3 pages, <http://searchnetworking.techtarget.com/sDefinition/0,,sid7_gci754347,00.html>.

Postel, "RFC879—TCP maximum segment size and related topics", Nov. 1983, 13 pgs.

Jacobson et al., "RFC1 072—TCP extensions for long-delay paths", Oct. 1988, 33 pgs.

Wang et al, "TCP startup Performance in Large Bandwidth Delay Networks", IEEE, 2004, pp. 796-805.

Eric Weisstein's World of Mathematics, "Smoothing" Jul. 2000, 1 pg.

FOLDOC, "definition of maximum segment size", http://foldoc.org/?maximum+size, Mar. 6, 1998, 1 pg.

Non-Final Rejection in U.S. Appl. No. 10/957,024, mailed Nov. 9, 2009, 36 pgs.

About Computing & Technology, "Wireless/Networking, Nagle algorithm," visited Dec. 6, 2005, 2 pages, <http://compnetworking.about.com/od/tcpip/l/bldef_nagle.htm>.

Australia's Academic and Research Network, "Programs and large MTU, Nagle algorithm," visited Dec. 9, 2005, 3 pages, <http://www.aarnet.edu.au/engineering/networkdesign/mtu/programming.html>.

Berners-Lee, T. et al., RFC 1945, "Hypertext Transfer Protocol—HTTP/1.0," May 1996, 51 pages.

Dierks, T. et al., RFC 2246, "The TLS Protocol, Verison 1.0," Jan. 1999, 80 pages.

Fielding, R. et al., RFC 2616, "Hypertext Transfer Protocol—HTTP/1.1," Jun. 1999, 114 pages.

fifi.org, "Manpage of TCP," visited Dec. 9, 2005, 6 pages, <http://www.fifi.org/cgi-bin/man2html/usr/share/man/man7/tcp.7.gz>.

Freier, A. et al., Netscape Communications Corporation, "The SSL Protocol, Version 3.0," Mar. 1996, 60 pages.

Kessler, G. et al., RFC 1739, "A Primer on Internet and TCP/IP Tools," Dec. 1994, 46 pages.

Nagle, J., RFC 896, "Congestion control in IP/TCP internetworks," Jan. 6, 1984, 13 pages.

OpenSSL, visited Apr. 12, 2006, 1 pg., <www.openssl.org>.

Office Communication for U.S. Appl. No. 10/957,024, mailed Jan. 25, 2011.

Office Communication for U.S. Appl. No. 11/537,474, mailed Feb. 23, 2009.

Office Communication for U.S. Appl. No. 11/537,474, mailed Oct. 14, 2009.

Office Communication for U.S. Appl. No. 11/537,474, mailed Dec. 30, 2009.

Office Communication for U.S. Appl. No. 11/537,474, mailed Apr. 11, 2011.

RFC 793 "Transmission Control Protocol Darpa Internet Program Protocol Specification," Information Sciences Institute, University of Southern California, Sep. 1981, pp. 1-60 www.faqs.org/rfcs/rfc793.html.

RFC 2326 "Real Time Streaming Protocol (RTSP)" The Internet Society, Apr. 1998, pp. 1-76 www.ietf.org/rfc/rfc2326.txt.

RFC 2616 "Hypertext Transfer Protocol—HTTP/1.1" The Internet Society, Jun. 1999, pp. 1-124 www.faqs.org/rfcs/rfc2616.html.

RFC 3550 "RTP: A Transport Protocol for Real-Time Applications" The Internet Society, Jul. 2003, pp. 1-86 www.ietf.org/rfc/rfc3550.txt.

RFC 3986 "Uniform Resource Identifier (URI): Generic Syntax" The Internet Society, Jan. 2005, pp. 1-51 www.ietf.org/rfc/rfc3986.txt.

SELECTIVE COMPRESSION FOR NETWORK CONNECTIONS

CROSS-REFERENCE TO RELATED APPLICATIONS

This Application is a Divisional Patent Application of U.S. patent application Ser. No. 10/957,024, filed on Oct. 1, 2004, entitled "Selective Compression For Network Connections," which is incorporated by reference herein in its entirety.

FIELD OF THE INVENTION

This invention relates generally to network communications, and more particularly but not exclusively, to the compression of network communications.

BACKGROUND OF THE INVENTION

According to some studies, the volume of information over a network, such as the Internet, is expected to more than triple over the next three years. Data and content is likely to remain the largest percentage of Internet traffic, with the majority of this information being dynamic. Often, the issues of concern with Internet traffic range from business to consumer response and order times, to the time required to deliver business information to a traveler using a wireless device, to the download time for rich media such as music, videos, and so forth. Thus, not surprisingly, a major complaint among Internet users is a lack of speed. Additionally, users' complaints often center on how long it takes to display a web page, or other content, on their computing device. One solution therefore, may be to send less data. This is where compression may help.

The idea is to compress data being sent from a server, and to have a client's browser decompress this data virtually on the fly, thereby reducing the amount of data sent over the Internet, and increasing a web page display speed. Many, although not all, browsers are now equipped to support the Hypertext Transfer Protocol (HTTP) standard that enables compression as a type of "content-encoding." Content-encoding can often significantly reduce web page download times for highly compressible content, such as text, style sheets, XML, text document attachments, and HTML. The benefit is especially pronounced for clients communicating over low-bandwidth links. However, while static pages can be pre-compressed on a server, compressing dynamic web pages requires significant server resources, and often can not be pre-compressed. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

As used herein, the term "or" is to be considered to mean "and/or" unless the context clearly indicates otherwise.

Briefly stated, the invention is directed towards a system, apparatus, and method for selectively providing content compression to a client based, in part, on whether the network connection from the client is determined to be a high latency, low-bandwidth connection. Content compression may include any of a variety of compression mechanisms, including HTTP compression, and the like. The present invention gathers one or more network metrics associated with the connection from the client. In one embodiment, the network metrics include estimated TCP metrics, such as round trip time (RTT), maximum segment size (MSS), and bandwidth delay product (BWDP). These estimated network metrics are employed to make an application layer decision. For example, in one embodiment, the estimated network metrics are employed to determine whether the client network connection is a high latency, low-bandwidth connection. If it is, then content may be compressed for transfer over the network connection. In one embodiment, the compression mechanism uses a content encoding compression feature of the HTTP protocol standard. However, the invention is not limited to the above use. For example, the invention may also be employed to make traffic management decisions, to load balance high latency, low-bandwidth network connections towards a pre-defined server, manage data streaming, and for other application layer decisions. As used herein, application layer refers to layers 5 through 7 of the seven-layer protocol stack as defined by the ISO-OSI (International Standards Organization-Open Systems Interconnection) framework.

Illustrative Operating Environment

Figure 1:
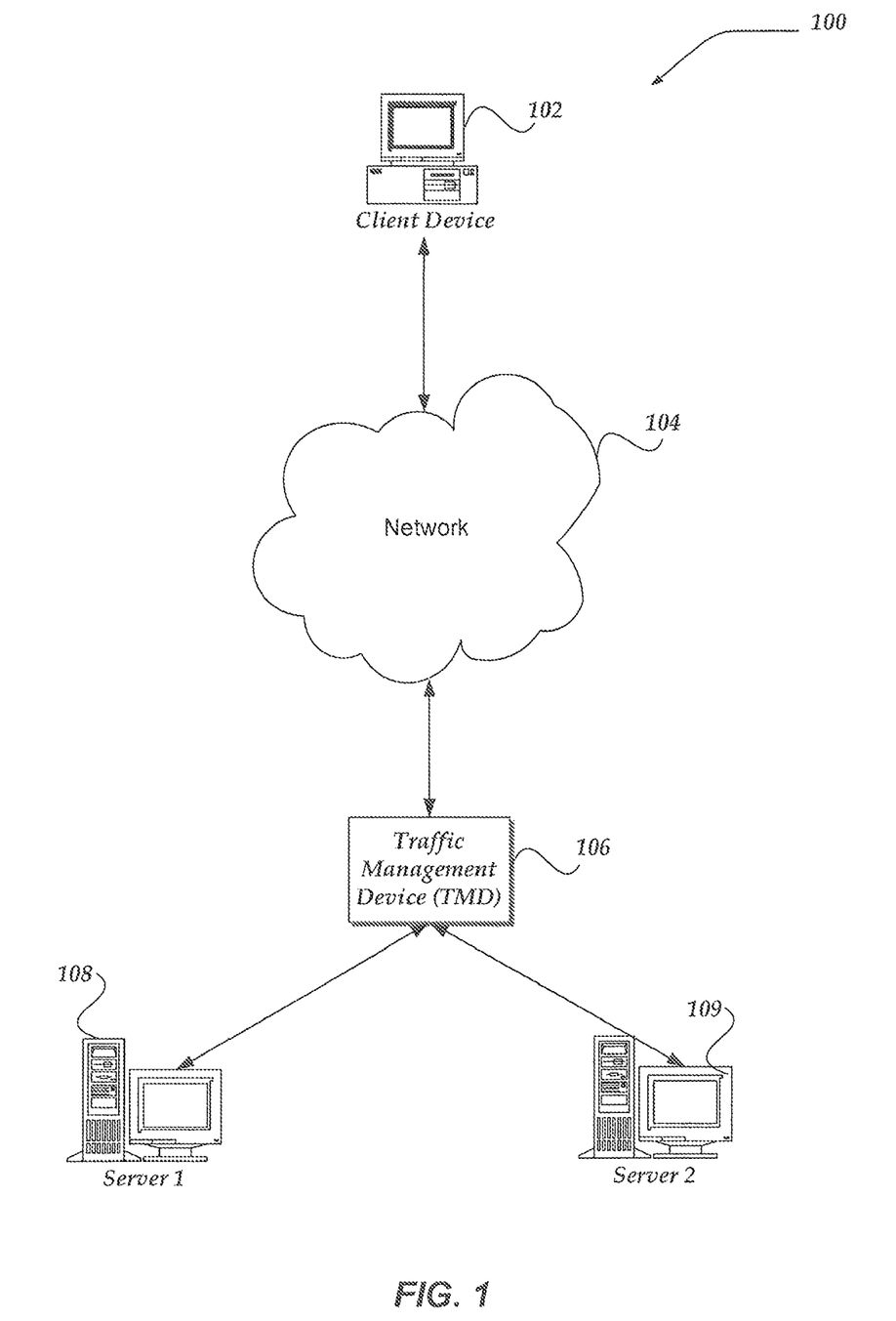
FIG. 1 shows a functional block diagram illustrating one embodiment of an environment for practicing the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 104, traffic management device (TMD) 106, and servers 108-109. Client device 102 is in communication with TMD 106 through network 104. TMD 106 is in further communication with servers 108-109. Although not shown, TMD 106 may be in communication with servers 108-109 through a network infrastructure that is similar to network 104.

Generally, client device 102 may include virtually any computing device capable of connecting to another computing device to send and receive information, including web requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications over network 104.

Client device 102 may communicate with network 104 employing a variety of network interfaces and associated communication protocols. Client device 102 may, for example, use various dial-up mechanisms with a Serial Line IP (SLIP) protocol, Point to Point Protocol (PPP), and the like. As such, client device 102 may transfer content at a low transfer rate, with potentially high latencies. For example, client device 102 may transfer data at about 14.4 to about 56 kbps, or potentially more. In another embodiment, client device 102 may employ a higher-speed cable, Digital Subscriber Line (DSL) modem, Integrated Services Digital Network (ISDN) interface, ISDN terminal adapter, and the like. As such, client device 102 may be considered to transfer data using a high bandwidth interface varying from about 32 kbps to over 622 Mbps, although such rates are highly variable, and may change with technology.

Network 104 is configured to couple client device 102, with other network devices, such as TMD 106. Network 104 is enabled to employ any form of computer readable media for communicating information from one electronic device to another. In one embodiment, network 104 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 104 includes any communication method by which information may travel between client device 102 and TMD 106.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

TMD 106 includes virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from an array of servers, such as servers 108-109. TMD 106 may direct a request for a resource to a particular server based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as Web browsing, email, telephony, streaming multimedia and other traffic that is sent in packets. The BIG-IP Traffic Manager, by F5 Networks, is one example of a TMD. The 3-DNS Controller, by F5 Networks, is another example of a TMD.

TMD 106 may receive requests from client device 102. TMD 106 may select a server from servers 108-109 to forward the request. TMD 106 may employ any of a variety of criteria and mechanisms to select the server, including those mentioned above, load balancing mechanisms, and the like. TMD 106 may receive a response to the request and forward the response to client device 102.

TMD 106 may determine various network metrics associated with a network connection between client device 102 and itself. Based, in part, on the network metrics, TMD 106 may perform various application layer decisions. For example, in one embodiment, TMD 106 may compress content sent from servers 108-109 based on whether the network metrics indicate that the network connection is a high latency, low-bandwidth link. In another embodiment, TMD 106 may direct servers 108-109 to perform content compression based on latency or bandwidth metrics. In still another embodiment, TMD 106 may determine that the network connection is a high bandwidth link, and not perform compression. The decision not to compress the content may be directed, for example, towards improving efficiency of TMD 106, and/or servers 108-109. TMD 106 may further employ a process such as described below in conjunction with FIGS. 4-5 to selectively compress the content. TMD 106 or servers 108-109 may have two or more possible compression algorithms or level of compression to use. The compression algorithms or levels may vary in the length of time to execute or the amount of compression that results. In one embodiment, TMD selects one of the compression algorithms or level of compression based on latency, bandwidth, or other metrics described herein.

In another embodiment, TMD 106 may determine a network connection characteristic and, based on the network connection characteristic, select to forward communications to server 108 rather than to server 109. In still another embodiment, TMD 106 may also perform other application layer decisions based on various network connection characteristics, including streaming of content, and the like. In one embodiment, for example, multiple versions of websites may exist on one or more servers. One version of a website may be configured to include, for example, high-resolution images, and the like, while another website includes very few high-resolution images, and the like. TMD 106 may forward communications to the server or web site version having higher resolution images based on its determination that the network connection has low latency or high bandwidth.

In one embodiment, multiple servers may be geographically distributed from each other. TMD 106 may make a decision as to which server is best to respond to a request from client 102, based on whether the client 102 is connected to the network 104 with a high bandwidth connection. TMD may then either forward a communication to the selected server or cause the client request to be redirected to the selected server. HTTP redirection may be used to redirect the client request.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software.

Servers 108-109 may include any computing device capable of communicating packets with client computer 102. Each packet may convey a piece of information. A packet may be sent for handshaking, i.e., to establish a connection or to acknowledge receipt of data. The packet may include information such as a request, a response, or the like. Generally, packets received by servers 108-109 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between servers 108-109, TMD 106, and client device 102 employing HTTP, HTTPS, and the like.

In one embodiment, servers 108-109 are configured to operate as a website server. However, servers 108-109 are not limited to web servers, and may also operate a messaging server, a File Transfer Protocol (FTP) server, a database server, content server, and the like. Additionally, each of servers 108-109 may be configured to perform a different operation. Thus, for example, back-end server 108 may be configured as a messaging server, while back-end server 109 is configured as a database server. Moreover, while servers 108-109 may operate as other than a website, they may still be enabled to receive an HTTP communication.

Devices that may operate as servers 108-109 include personal computers desktop computers, multiprocessor systems, microprocessor-based or programmable consumer electronics, network PCs, servers, and the like.

It is further noted that terms such as client and server may refer to functions within a device. As such, virtually any device may be configured to operate as a client device, a server device, or even include both a client and a server function. Furthermore, where two or more peers are employed, any one of them may be designated as a client or as a server, and be configured to confirm to the teachings of the present invention.

Illustrative TMD Environment

Figure 2:
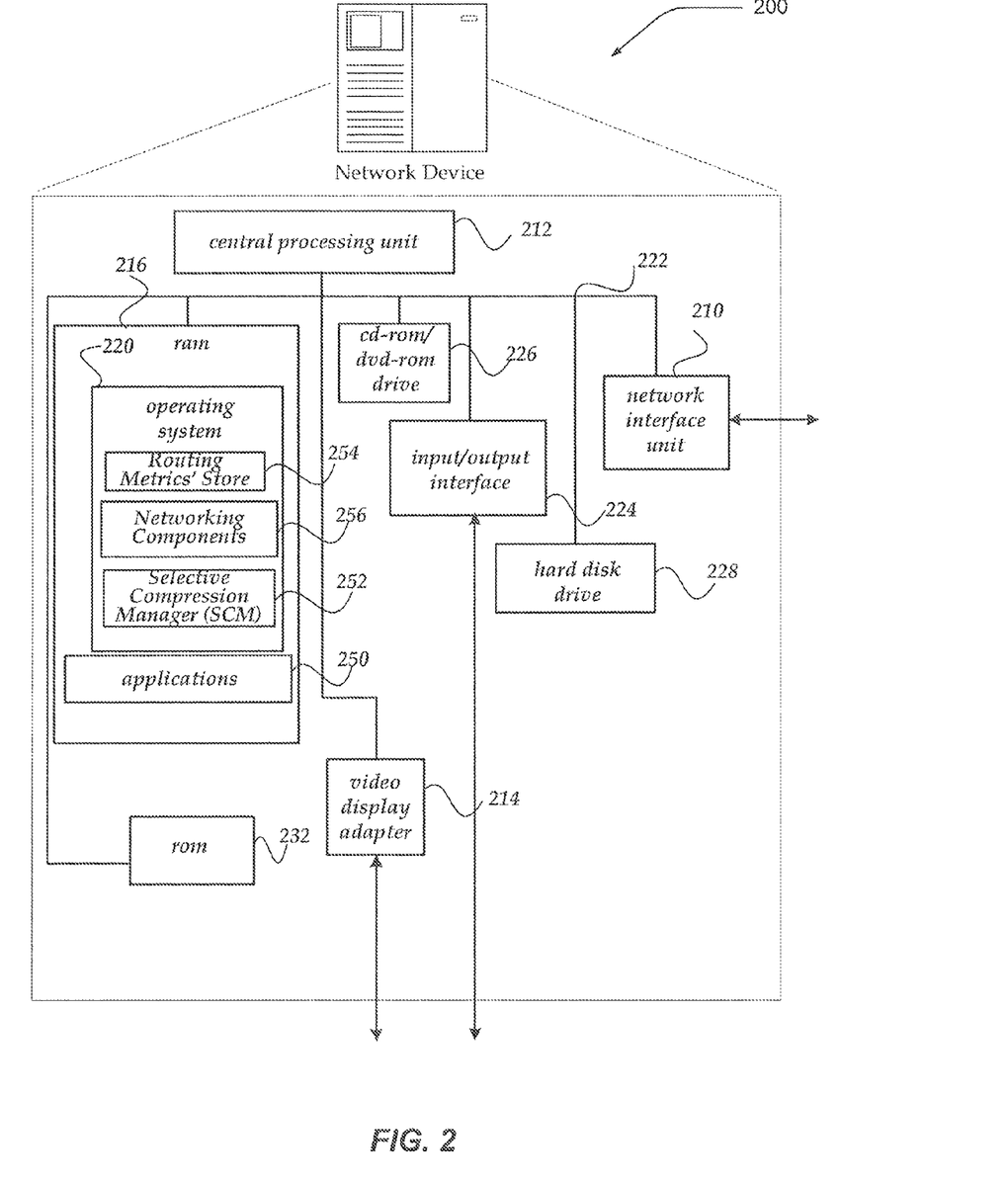
FIG. 2 shows one embodiment of a server device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200.

Operating system 220 may further include networking components 256, routing metrics' store 254, and selective compression manager (SCM) 252. Routing metrics' store is described in more detail below in conjunction with FIG. 3. Networking components 256 may for example, include various components to manage operations of the Open Systems Interconnection (OSI) network stack, including Internet Protocol (IP), TCP, UDP, SSL, HTTP, content encoding (content compression), and similar network related services. Networking components 256 may determine various network metrics, including, TCP maximum segment size (MSS), smoothed round trip time (RTT) for a connection, bandwidth delay product (BWDP), and the like. Networking components 256 may expose such network metrics to SCM 252. Smoothed round trip time includes round trip times that are sampled and smoothed over an interval to minimize impact of outliers, and/or possible aberrant readings from a packet drop, and the like.

Networking components 256 are further configured to retrieve various network metrics and to refine estimates of the network metrics for a given client device/gateway combination, where the gateway may include a router, gateway device, and the like (not shown) between TMD 106 and client device 102 of FIG. 1. Networking components 256 may store the refined estimated network metrics in routing metrics' store 254. Networking components 256 also may employ a process such as described below in conjunction with FIG. 5.

SCM 252 is configured to retrieve the estimated network metrics, and similar network connection characteristics, and to make an application decision based, in part, on them. SCM 252 may enable a user to configure various rules, decisions, events, conditions, and the like, as part of the application decisions. In one embodiment, enabling the user to configure a rule, and the like, may include employing an interpretative language, a complied network programming language, and the like. SCM 252 may enable a user to combine one or more network metrics, and the like, to make a decision to selectively compress content. In one embodiment, for example, the user may implement a rule, condition, and the like, that employs a predetermined threshold value for a network metric. Then, when the network metric falls below the predetermined threshold, the associated network connection may be considered to be a high latency, low-bandwidth link. SCM 252 may then compress content sent on towards the client device. SCM 252 may employ a process such as described in conjunction with FIG. 4 below.

Although illustrated in FIG. 2 as distinct components, networking components 256, routing metrics' store 254, and SCM 252 may be arranged, combined, and the like, in any of a variety of ways, without departing from the scope of the invention. For example networking components 256, routing metrics' store 254, and SCM 252 may be configured to operate a single component. Moreover, SCM 252 and/or routing metrics' store 254 may reside outside of operating system 220. Furthermore, while networking components 256, routing metrics' store 254, and SCM 252 are discussed as residing with TMD 106 of FIG. 1, the invention is not so limited. For example, one or more networking components 256, routing metrics' store 254, and SCM 252 may reside instead within at least one of servers 108-109.

As illustrated in FIG. 2, network device 200 also can communicate with the Internet, or some other communications network, such as network 104 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, traffic management programs, security programs, and so forth.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like. Similarly, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of traffic manager 252 and/or pipeline manager 254.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Figure 3:
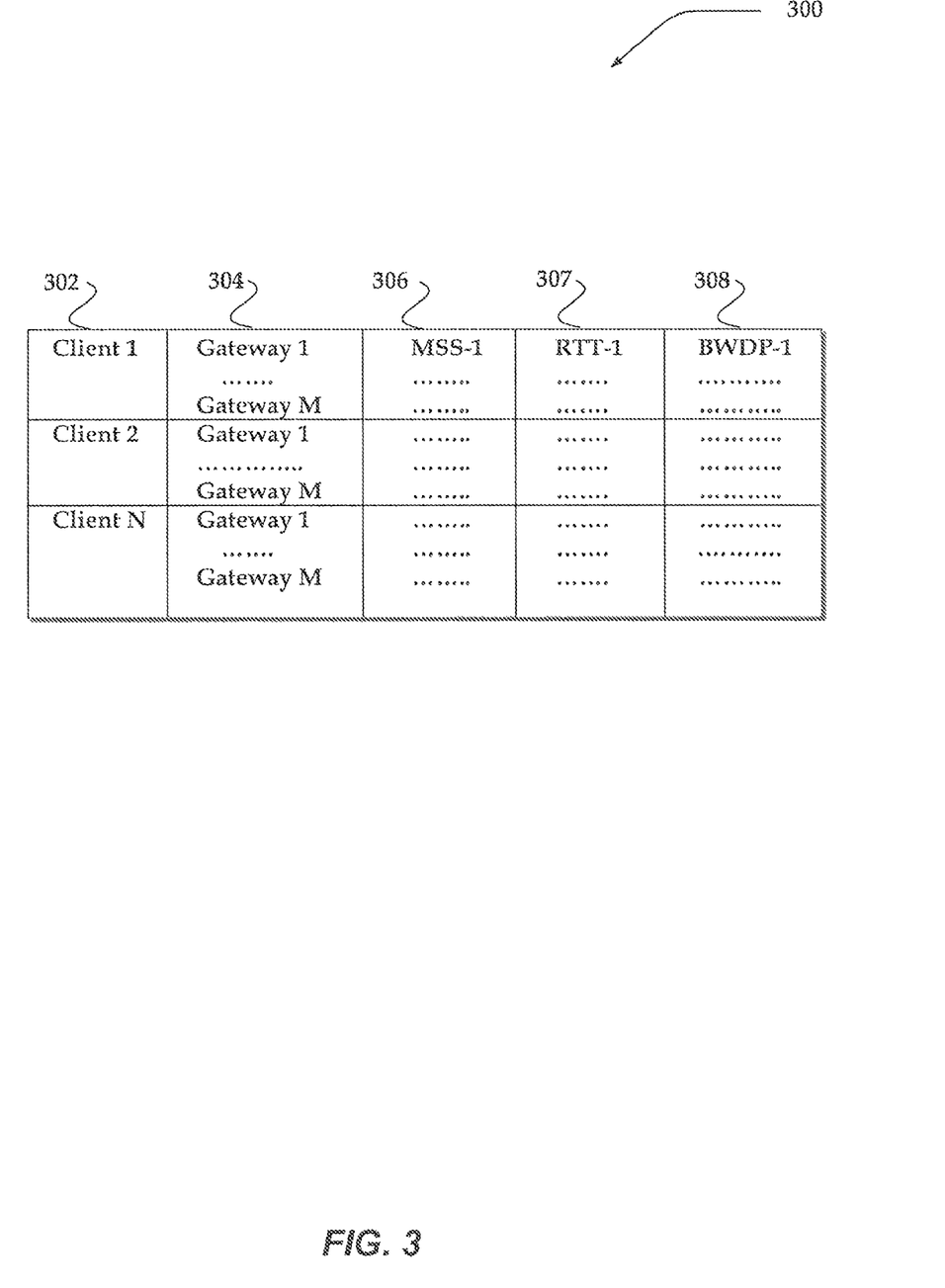
FIG. 3 shows one embodiment of a routing metric table useable in managing client connection metrics.

FIG. 3 shows one embodiment of routing metrics' store 300 useable in managing client network metrics. Although the invention is described below in terms of using a table, the invention is clearly not so limited and virtually any structure may be employed to store network metrics, including a spreadsheet, folder, database, text file, and the like.

Routing metrics' store 300 may include many more or less components than those shown. The components shown, however, are sufficient to disclose an illustrative embodiment for practicing the invention. As shown in the figure, routing metrics' store 300 includes client identifiers 302, gateway identifiers 304, and network metrics 306-308.

As illustrated in the figure, network metrics 306-308 may be associated with a given client/gateway pair (client identifier 302/gateway identifier 304). However, network metrics 306-308 may also be collected and stored based on client identifier 302 and not gateway identifier 304.

Client identifier 302 includes virtually any characters, numbers, and/or combination of characters and numbers that uniquely identify a client device that is in communication with the network device, such as TMD 106 of FIG. 1. Similarly, gateway identifier 304 is intended to uniquely identifier a router, gateway, firewall, and the like that couples the client device to TMD 106. For example, in one embodiment, client identifier 302, and gateway identifier 304 are IP addresses of the client device and the gateway device, respectively.

Network metric 307 represents smoothed round trip time (RTT) for a given client device/gateway combination. RTT typically is employed to determine how long to wait before a packet segment may be deemed to have been dropped during a network transmission and another packet is to be sent. That is, RTT is one metric that may be employed to handle network packet loses during a network communication. Additionally, the RTT metric may also be employed as a mechanism for estimating a client's data latency. For example, an RTT metric value around 500 msec may indicate a high latency client network connection, whereas a value around 10 msec may indicate a low-data latency client network connection. Because an RTT may require time to converge to a representative value of the network connection, network metric 307 may represent a smoothed estimate of RTT.

RTT may be determined in any of a variety of ways. For example, in one technique, an RTT estimate, which is included in the TCP protocol, may be determined based on a time delta between two or more TCP segments exchanged between communicating network endpoints. In another technique, one or more packets may be sent to a target device to elicit a response, and the time until a response packet is received from the target device, or an intermediary device, is measured. TCP packets, ICMP packets, and UDP packets, are examples of packets that can be used to obtain an RTT measurement. Thus, as used herein, determining an RTT includes at least all of the above techniques, unless clearly limited otherwise.

A high latency client may not necessarily be a low-bandwidth network connection client, however. For example, a satellite link, trans-Atlantic link, and the like, may have high latencies, but may also be high bandwidth connections. Thus, additional metrics may also be collected.

One such other network metric includes maximum segment size (MSS), shown as network metric 306. Briefly, MSS typically represents a maximum TCP segment size that is not exceeded for a length of a data field in a TCP packet. Ethernet typically offers, for example, an MSS around 1500 bytes for the data field. A typical TCP/IP broadband connection may be between about 1148 to about 1460 bytes, with IPv6 connections typically being around 1440 bytes. MSS values in the 1300-1400 byte range may further indicate a use of a tunneling protocol, such as VPN, Point to Point Protocol over Ethernet (PPPoE), and the like. MSS values around 536 bytes tend to indicate the network connection may be a SLIP, PPP, or similar dial-up connection. Thus, the invention may collect and employ MSS metrics to further determine whether the network connection with a client device is a high-latency, low-bandwidth link.

Another network metric may include network metric 308 as a bandwidth delay product (BWDP). Briefly, BWDP may be employed to determine a maximum amount of data that may be placed on a network connection within a given time window. BWDP may be employed then to further determine a speed of a network connection.

Although only MSS, RTT, and BWDP are illustrated, the invention is not so limited, and other network metrics may be determined and stored in routing metrics' store 300 without departing from the scope or spirit of the invention.

Generalized Operation

Figure 4:
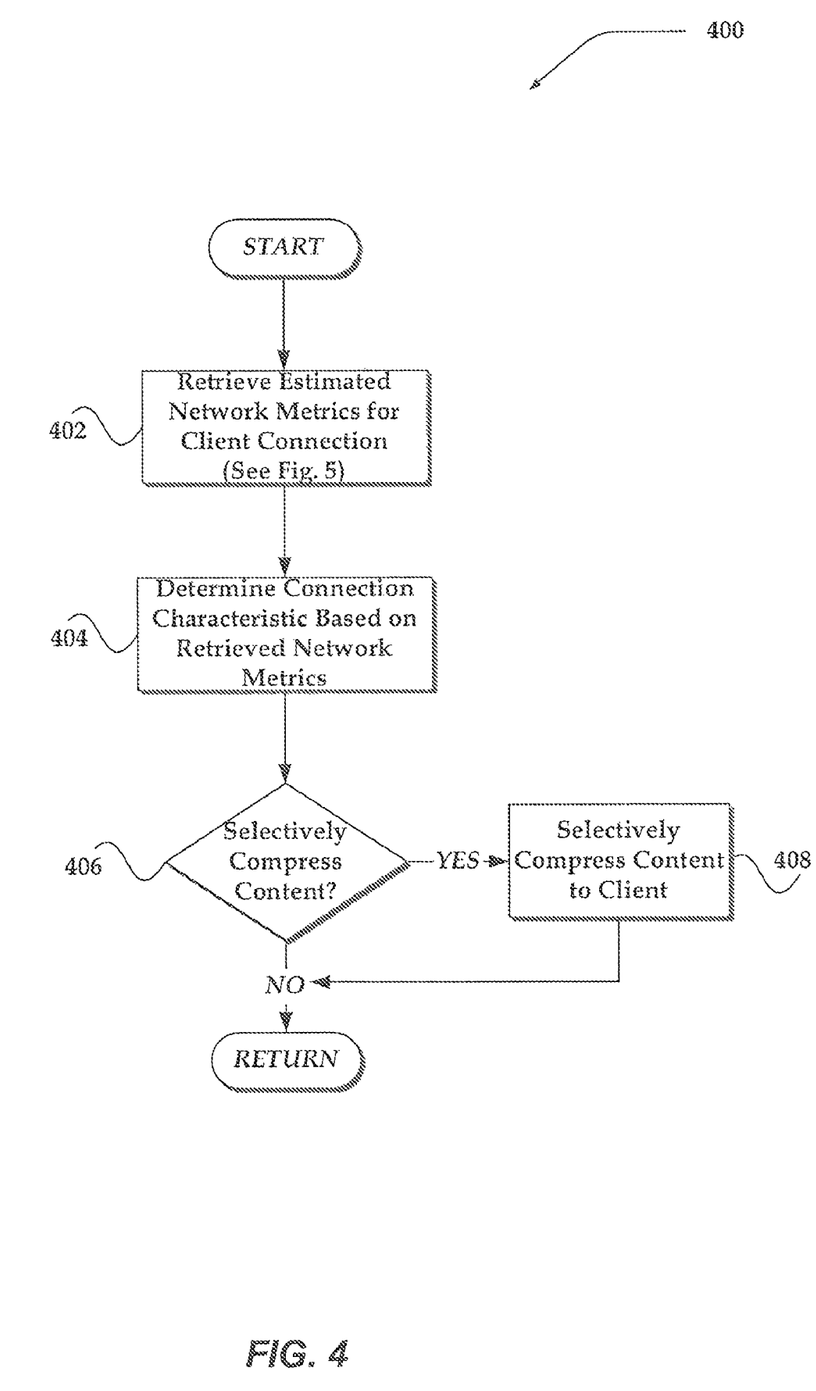
FIG. 4 illustrates a logical flow diagram generally showing one embodiment of a process for managing a communication with a client device using network metrics.

The operation of certain aspects of the invention will now be described with respect to FIGS. 4-5. FIG. 4 illustrates a logical flow diagram generally showing one embodiment of a process for managing a communication with a client device using network metrics. Process 400 of FIG. 4 may be implemented, for example, within SCM 252 of FIG. 2.

Figure 5:
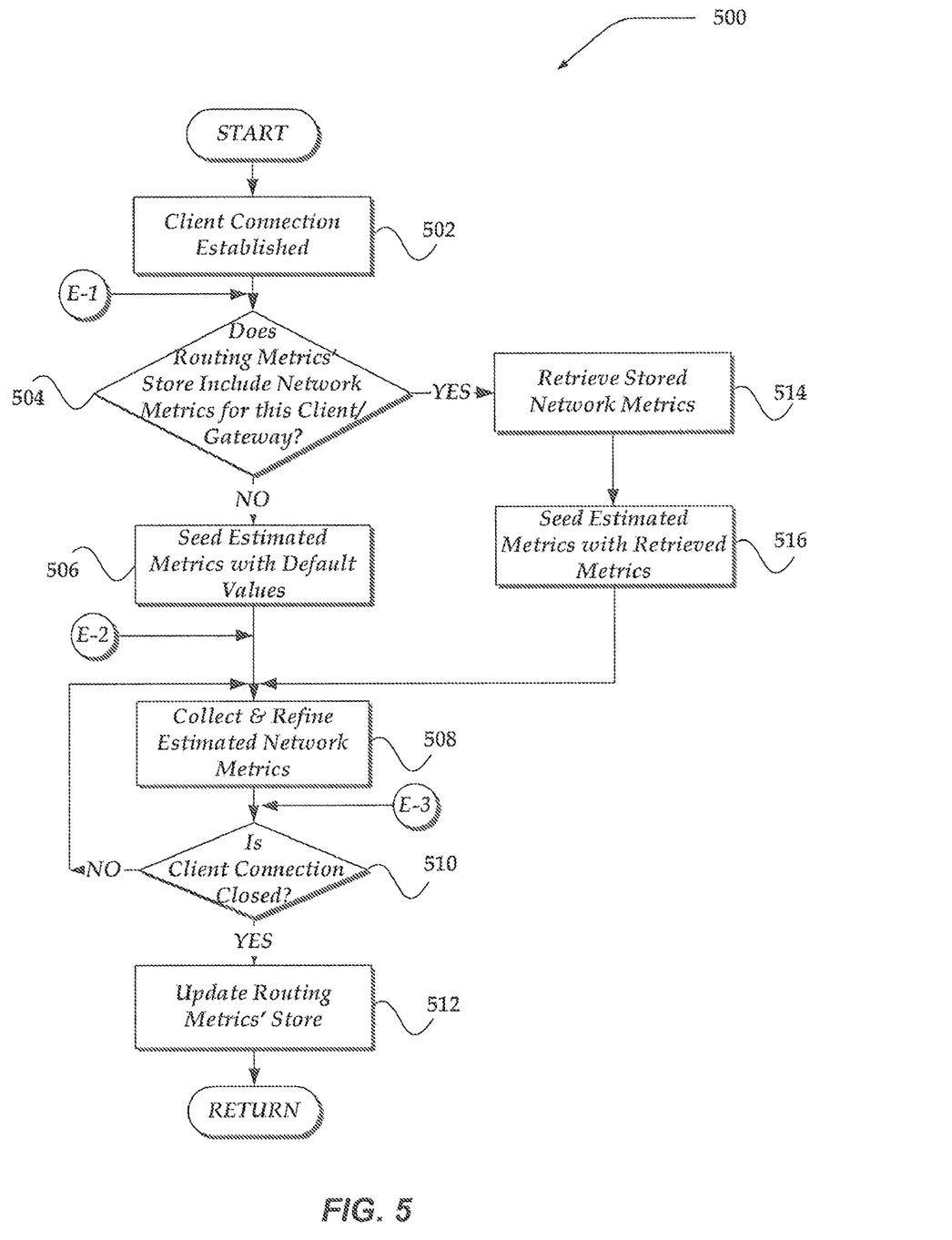
FIG. 5 illustrates a logical flow diagram generally showing one embodiment of a process for determining client network metrics, in accordance with the invention.

Process 400 begins, after a start block, at block 402, which is described in more detail in conjunction with FIG. 5. Briefly however, at block 402 estimated network metrics are retrieved for a client connection. In one embodiment, the estimated network metrics include estimated values for RTT, MSS, and BWDP.

Processing continues next to block 404, where the retrieved network metrics are employed to determine a connection characteristic, such as whether the network connection is a high latency, low-bandwidth network connection. One or more of the retrieved network metrics are employed to make this determination. In one embodiment, a MSS value below one predefined threshold value is employed to determine if the client connection is likely to be a high latency, low-bandwidth network connection. Another threshold value may be employed to determine whether the BWDP indicates a high or low-bandwidth network connection. Similarly, RTT values below yet another predefined threshold may indicate a low-bandwidth network connection. These predefined threshold values may be determined based on a variety of criteria, including engineering judgment and experience. The results may then be weighted and/or combined to provide an overall estimate of the client network connection characteristic.

Process 400 next flows to decision block 406, where, based on the determination at block 404, a decision is made whether to perform an application layer operation. As shown in, process 400, one embodiment of the operation includes selectively compressing content communicated with the client device. Selective compression may be employed, for example, where the determination at block 404 indicates that the network connection is a high latency, low-bandwidth connection. If it is determined not to be a high latency, low-bandwidth connection, processing returns to a calling process to perform other actions.

Otherwise, processing flows to block 408, where content from the server may be compressed prior to sending the content to the client device. In one embodiment, content is compressed using the content encoding feature of HTTP. In another embodiment, block 408 may result in forwarding traffic to a predetermined server or servers dedicated to servicing low-bandwidth client devices. Upon completion of block 408, processing returns to a calling process to perform other actions.

FIG. 5 illustrates a logical flow diagram generally showing one embodiment of a process for determining client network metrics. Process 500 of FIG. 5 may be implemented, for example, within networking components 256 of FIG. 2.

Process 500 begins, after a start block, at block 502, where a client connection is established. A client connection may typically be considered to be established after a series of synchronization handshakes, such as a standard TCP SYN/SYN-ACK/ACK handshake, and the like.

Processing moves next to decision block 504, where a determination is made whether there are network metrics for this client/gateway combination. In one embodiment, a routing metrics' store is examined to determine whether such network metrics have been saved from a previous network connection for this client/gateway combination. If there are stored metrics, processing branches to block 514; otherwise, processing proceeds to block 506.

At block 506, because network metrics are not available for this client/gateway combination, the estimated network metrics are seeded with default values. The default values may be selected based on a variety of criteria, including selecting conservative values, non-zero values, and the like. In one embodiment, a default value for MSS may be selected based on an early value for the current client/gateway connection. That is, in one embodiment, the MSS may be supplied on an initial synchronization from the client. Moreover, the default values by include a best-guess approximation of the network metrics that may have been gathered on this connection so far (e.g., a smoothed variance of RTT, a moving averaged of BWDP, and collected initial MSS). Processing proceeds next to block 508.

At block 514, because network metrics are available for this client/gateway combination, they are retrieved. Processing continues to block 516, where the retrieved network metrics are used to seed the estimated network metrics. Processing continues to block 508.

At block 508, additional networking information is collected to further refine estimates of the network metrics. Refinement may include employing a variety of smoothing mechanisms to improve the estimates, including using a moving average approach. Processing flows next to decision block 510, where a determination is made whether the client connection is closed. If it is closed, processing flows to bock 512; otherwise, processing loops back to block 508, where further networking information is collected to continue to refine the estimates of the network metrics.

At block 512, however, when it is determined that the client connection is closed, the refined network metrics are used to update the routing metrics' store for this client/gateway connection combination. Processing then returns to a calling process to perform other actions.

FIG. 5 also illustrates one embodiment of at least three possible locations, E-1 through E-3, where process 400 may operate to retrieve network metrics. Thus, for example, at E-1, after the recognition of the client connection (block 502), initial networking connection metrics may be employed by the application layer to make a decision. Additionally, at E-2, default seed metrics may be employed by process 400. At E-3, process 400 may also enter to retrieve refined network metrics. However, the invention is not limited to these locations, and others may be used to retrieve the network metrics, without departing from the scope or spirit of the invention.

In one embodiment, system 100 includes two or more TMDs. The multiple TMDs may be collocated in a local area network, or geographically distributed. A first TMD having collected metric information from a client may send the metric information to the second TMD, for use in the above-described process. In one embodiment, a first TMD that employs redirection to cause the client to communicate with a second TMD, the second TMD may use two or more IP addresses, where the first TMD redirects the client to one of the IP addresses based on the latency or bandwidth of the client.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a communication with a client device over a network, comprising:
   a transceiver for receiving and sending information to the client device through at least one of a plurality of gateways being interposed between the client device and at least a first and a second target server; and
   a traffic management component operating on the network device and that is configured to perform actions, including:
      determining a plurality of network metrics for at least one client device/gateway combination;
      combining results of evaluations of each of the plurality of network metrics to a different threshold value into a single network connection characteristic for the at least one client device/gateway combination;
      selecting from the first or the second target server, based at least in part on the single network connection characteristic, wherein the first target server storing low bandwidth content is selected for network connections having a low bandwidth network connection characteristic, and the second target server storing high bandwidth content is selected for network connections having a high bandwidth network connection characteristic; and
      enabling a communication between the client device and the selected first or second target server.

2. The network device of claim 1, wherein traffic management component is configured to perform actions further comprising selectively enabling compression of content that is sent towards the client device, based on the single network connection characteristic.

3. The network device of claim 1, wherein the plurality of network metrics includes at least two of a round trip time (RTT), maximum segment size (MSS), and a bandwidth delay product (BWDP).

4. The network device of claim 3, wherein combining results of evaluations further comprises:
   comparing each of the at least two network metrics to a different threshold value;
   obtaining a result for each of the comparisons; and
   combining the results to determine the single network connection characteristic.

5. The network device of claim 1, wherein the single network connection characteristic indicates whether the at least one client device/gateway combination is a high latency and low bandwidth network connection.

6. The network device of claim 1, wherein determining a plurality of network metrics further comprises determining that at least one of the network metrics is unavailable for client device/gateway combination, and in response estimating the unavailable network metric.

7. A system, comprising:
   a first server device and a second server device, each server device being configured to store content; and
   a network device interposed between a client device and the first and second server devices, the network device being configured to perform actions, including:
      determining a plurality of network metrics for at least one client device/gateway combination;
      combining results of evaluations of each of the plurality of network metrics to a different threshold value into a single network connection characteristic for the at least one client device/gateway combination;

determining whether the combined results indicate that a network connection to the at least one client device/gateway combination is a low bandwidth high latency connection; and based on the determination, selecting from the first or the second server device, wherein the first server device is configured to provide content for at least low bandwidth high latency connections; and enabling a communication between the client device and the selected first or second server device.

8. The system of claim 7, wherein the first server device is configured to provide content that is currently compressed content for low bandwidth high latency connections.

9. The system of claim 7, wherein the first server device is configured to compress content for low bandwidth high latency connections prior to providing the content towards the at least one client device/gateway combination.

10. The system of claim 7, wherein determining a plurality of network metrics further comprises when it is determined that at least one of the network metrics is unavailable for the current client device/gateway combination, estimating the unavailable network metric based on a previous value of the network metric determined from a previous connection for the same client device/gateway combination.

11. The system of claim 7, wherein the plurality of network metrics includes at least two of a round trip time (RTT), maximum segment size (MSS), and a bandwidth delay product (BWDP).

12. The system of claim 7, wherein at least one network metric is a maximum segment size (MSS) that is initialized based on a value supplied during an initial synchronization from the client device.

13. The system of claim 7, wherein the network metrics are obtained during the client device/gateway connection over time as an estimate determined from a moving average.

14. A method operating on one or more network devices, comprising:

determining a plurality of network metrics for at least one client device/gateway combination, the one or more network devices being interposed between a client device and at least one gateway and a first server device and a second server device;

combining results of evaluations of each of the plurality of network metrics to a different threshold value into a single network connection characteristic for the at least one client device/gateway combination;

determining whether the combined results indicate that a network connection to the at least one client device/gateway combination is a low bandwidth high latency connection; and based on the determination, selecting from the first or the second server device, wherein the first server device is configured to provide content for at least low bandwidth high latency connections; and enabling a communication between the client device and the selected first or second server device.

15. The method of claim 14, wherein the first server device is configured to compress content for low bandwidth high latency connections prior to providing the content towards the at least one client device/gateway combination.

16. The method of claim 14, wherein determining a plurality of network metrics further comprises when it is determined that at least one of the network metrics is unavailable for the current client device/gateway combination, estimating the unavailable network metric based on a previous value of the network metric determined from a previous connection for the same client device/gateway combination.

17. The method of claim 14, wherein the plurality of network metrics includes at least two of a round trip time (RTT), maximum segment size (MSS), and a bandwidth delay product (BWDP).

18. The method of claim 14, wherein at least one network metric is a maximum segment size (MSS) that is initialized based on a value supplied during an initial synchronization from the client device.

19. The method of claim 14, wherein the network metrics are obtained during the client device/gateway connection over time as an estimate determined from a moving average.

20. The method of claim 14, wherein the plurality of network metrics are refined over time, such that determining whether the combined results indicate that a network connection for the at least one client device/gateway combination is a low bandwidth high latency connection is revised over time.

* * * * *

UNITED STATES PATENT AND TRADEMARK OFFICE
CERTIFICATE OF CORRECTION

PATENT NO. : 8,010,668 B1
APPLICATION NO. : 12/981338
DATED : August 30, 2011
INVENTOR(S) : Jesse A. Rothstein et al.

Page 1 of 1

It is certified that error appears in the above-identified patent and that said Letters Patent is hereby corrected as shown below:

On the Title Page, in Item [56], under "Other Publications", in column 2, line 2, delete "Nagie" and insert -- Nagle --, therefor.

On Title Page 3, in Item [56], in column 1, line 2, under "Other Publications", delete "Dowload" and insert -- Download --, therefor.

On Title Page 3, in Item [56], in column 1, line 26, under "Other Publications", delete "Coporation," and insert -- Corporation, --, therefor.

On Title Page 3, in Item [56], in column 1, line 32, under "Other Publications", before "Engineering" delete "Electronic".

On Title Page 3, in Item [56], in column 1, line 45, under "Other Publications", delete "Cryoptography" and insert -- Cryptography --, therefor.

On Title Page 3, in Item [56], in column 2, line 18, under "Other Publications", delete "Verison" and insert -- Version --, therefor.

Signed and Sealed this
Tenth Day of January, 2012

David J. Kappos
*Director of the United States Patent and Trademark Office*